United States Patent [19]
Watanabe

[11] Patent Number: 5,907,558
[45] Date of Patent: May 25, 1999

[54] BURST SIGNAL RECEPTION METHOD AND APPARATUS

[75] Inventor: Hidekazu Watanabe, Tokyo, Japan

[73] Assignee: Sony Corporation, Tokyo, Japan

[21] Appl. No.: 08/859,731

[22] Filed: May 21, 1997

[30] Foreign Application Priority Data

May 21, 1996 [JP] Japan .................................. 8-125939

[51] Int. Cl.⁶ ...................................................... H04J 3/06
[52] U.S. Cl. ........................................... 370/514; 375/359
[58] Field of Search .................................... 370/506, 509, 370/512, 514; 375/356, 350, 343, 340, 342, 355, 359, 368, 354

[56] References Cited

U.S. PATENT DOCUMENTS

| | | |
|---|---|---|
| 4,592,074 | 5/1986 | Whikehart .................................. 450/51 |
| 4,829,543 | 5/1989 | Borth et al. ............................... 375/343 |
| 5,031,193 | 7/1991 | Atkinson et al. ......................... 375/343 |
| 5,136,616 | 8/1992 | Dent .......................................... 375/343 |
| 5,222,144 | 6/1993 | Whikehart ................................ 375/340 |
| 5,732,337 | 3/1998 | Wargnier et al. ......................... 375/350 |

*Primary Examiner*—Dang Ton
*Assistant Examiner*—Phirin Sam
*Attorney, Agent, or Firm*—Jay H. Maioli

[57] ABSTRACT

A burst signal reception method that detects specific data having a constant pattern and arranged at a predetermined position in a burst signal and performs a reception of the burst signal in synchronization with the detected specific data. Received data is thinned and sampled in a sampling period which is smaller than a sampling period of the specific data. The sampled signal and previously prepared data having the same sampling period are compared with each other to detect the specific data.

6 Claims, 7 Drawing Sheets

| | I | Q | |
|---|---|---|---|
| t 0 | 1 | −1 | |
| t 1 | − | − | (Undefined) |
| t 2 | −1 | 1 | |
| t 3 | − | − | (Undefined) |

BURST SIGNAL RECEPTION METHOD AND APPARATUS

BACKGROUND OF THE INVENTION

1. Field of the Invention

The present invention relates to a burst signal reception method and a burst signal reception apparatus and, more particularly, to a burst signal reception method and a burst signal reception apparatus which are suitably applied to a terminal apparatus of a digital radio telephone system which transmits a burst signal which is converted into digital data.

2. Description of the Related Art

As a radio telephone system, there is proposed such one to which applied is a transmission system called a TDMA system (time-division multiple access system) for converting transmission data such as an audio signal or the like into digital data, adding various data such as synchronizing data or the like to the digital data to obtain slot data for each predetermined period of time, and transmitting/receiving the slot data in a time-division manner. In the radio telephone system (e.g., an European GSM system) using this transmission system, radio communication using the above transmission system is performed between base stations arranged at a predetermined interval and terminal apparatuses serving as radio telephone apparatuses to establish a telephone circuit using radio communication. However, when a radio telephone circuit is established by each terminal apparatus, a control channel serving as a predetermined channel is detected to receive data transmitted through the control channel, and the transmission/reception state of the terminal apparatus is set to a state designated by the received data to start communication between the terminal apparatus and the base station.

Here, as the burst signal transmitted from the base station through the control channel, a signal (sine-wave signal having a frequency offset from a carrier frequency by about +67 kHz) having a predetermined pattern called an FCCH (frequency correction channel) is distributed in a predetermined cycle (e.g., cycle of 10 or 11 frames). A process timing is corrected with reference to the FCCH on the terminal apparatus side, and a slot timing at which necessary information is transmitted is roughly detected.

This FCCH is a synchronizing signal to which a bit pattern is allocated such that data of a value of "0" are continued by a predetermined number of bits upon demodulation. In the GSM system, the bit pattern is convolutely coded, then subjected to GMSK modulation (gaussian filtered minimum shift keying modulation) and transmitted. In this manner, as shown in FIG. 9, the FCCH is transmitted by a synthetic wave between an I signal and a Q signal which are offset by a phase of 90° and have signal levels changed in a sine waveform. In the control channel, while this FCCH is transmitted, a carrier frequency is offset by +67.7 kHz.

Therefore, in a terminal apparatus employing this system, when the signal component of the FCCH is extracted from a reception signal by using a bandpass filter, the timing of the FCCH can be detected, and the entire operation can be roughly synchronized with the control channel with reference to the timing detection result.

In the GSM system, a period of time in which the FCCH serving as synchronizing data is transmitted is an extremely short period of term, i.e., about 550 μs, and hence this cannot be easily detected by an ordinary bandpass filter at high precision. Ordinary signal components also include a component which is offset from the carrier frequency by 67.7 kHz to some extent. Therefore, even if extraction is only performed by the bandpass filter, a signal in another period of time may be erroneously detected as an FCCH. In addition, a reception state in such a terminal apparatus may be frequently degraded, and the FCCH may be frequently distorted by noise or fading. From this point of view, it is very difficult to detect the FCCH at high precision.

For this reason, a signal component is not extracted by a bandpass filter to be detected, but the following proposal is made. That is, a reception signal is converted into digital data, and the converted data is checked on the basis of calculation in a digital process system in the terminal apparatus to detect an FCCH. However, a dedicated digital process circuit for detect an FCCH is not preferably arranged because the arrangement of the terminal apparatus becomes complex. Therefore, in a digital process circuit called a DSP (Digital Signal Processor) which is used for a data process in the terminal apparatus, an FCCH detection process may be performed. However, the DSP in which another data process is performed requires a long period of time, and the FCCH cannot be easily detected at real time. Even if the detection process can be performed at real time, a load for detecting the FCCH becomes heavy, and spare time for performing another signal process becomes very small. As a result, an interrupt process for the DSP can be rarely performed.

SUMMARY OF THE INVENTION

In view of such aspects, it is an object of the present invention to make a synchronizing process with synchronizing data possible by a simple and rapid process.

In order to solve the above problem, according to the present invention, received data is thinned and sampled in a sampling period which is smaller than a sampling period of specific data included in the received data, and the sampled signal and previously prepared data having the same sampling period are compared with each other to detect the specific data.

When the above process is performed, a process of detecting synchronizing data from a small number of data sampled at a low sampling period is performed. As a result, the synchronizing data can be detected by small data processes.

DESCRIPTION OF THE PREFERRED EMBODIMENT

An embodiment of the present invention will be described below with reference to the accompanying drawings.

Figure 2:
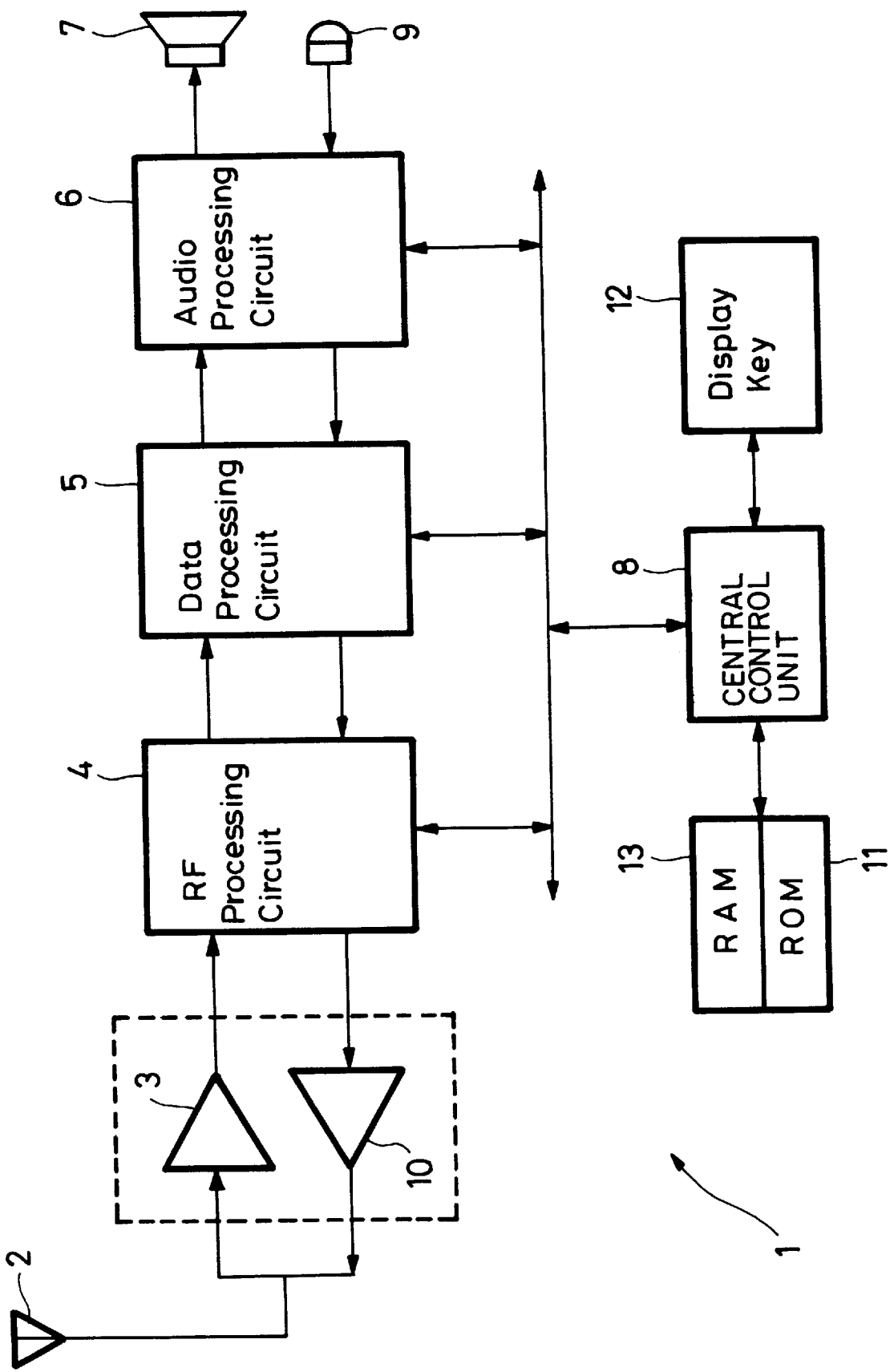
FIG. 2 is a block diagram showing a terminal apparatus according to an embodiment of the present invention.

In this embodiment, the present invention is applied to a terminal apparatus for a radio telephone system in which burst data having a slot arrangement is intermittently transmitted/received by a TDMA-type communication system. The entire arrangement of the terminal apparatus is shown in FIG. 2 first.

A terminal apparatus 1 receives a radio signal transmitted from a base station (not shown) at an antenna 2, and the resultant reception signal is supplied to an amplification circuit 3 through an antenna-sharing unit (not shown). After the amplification circuit 3 amplifies the reception signal at a predetermined gain, a high-frequency process circuit (RF process circuit) 4 changes the frequency of the reception signal by using a frequency signal output from a frequency synthesizer, thereby obtaining an intermediate-frequency signal. Here, when an output frequency from the frequency synthesizer is switched, a desired channel can be selectively received. The intermediate-frequency signal is orthogonally detected in the high-frequency process circuit 4, and an I signal and a Q signal which are orthogonally modulated on the reception signal are demodulated. The demodulated I signal and the demodulated Q signal are converted into digital data (I data and Q data) by an analog/digital converter incorporated therein. The converted I and Q data are supplied to a data process circuit 5.

The data process circuit 5 is constituted by a digital signal processor (DSP) serving as an integrated circuit for processing the I and Q data, and performs a process of demodulating original convolutely coded data from the I and Q data. At this time, a process in which the data is waveform-equalized and corrected with respect to distortion to output convolutely coded data is performed. In this manner, an influence of fading or multi-pass can be reduced. In addition, the data process circuit 5 detects an FCCH with reference to the I and Q data and detects a frequency error on the basis of the above detection result. An operation of the data process circuit 5 or the like is controlled with reference to the above detection result, so that the frequency error is corrected.

After the convolutely coded data is decoded, an error correction process is performed therefor. Audio data in the decoded data obtained by the above process is supplied to an audio process circuit 6, and control data in the decoded data is supplied to a central control unit 8.

In the audio process circuit 6, the supplied audio data is subjected to an audio expansion process to produce non-compressed audio data. This processed audio data can be converted into an analog audio signal by the incorporated digital/analog converter, and the converted audio signal is supplied to a speaker 7 to output the sound therefrom.

The central control unit 8 is constituted by a microcomputer functioning as a controller for controlling the operation of the terminal apparatus. The central control unit 8 performs various controls such as switching of a transmission/reception channel, setting of a communication timing or the like on the basis of control data supplied from the data process circuit 5.

The arrangement of the transmission system of the terminal apparatus 1 will be described below. An audio signal output from a microphone 9 is converted into digital audio data by the audio process circuit 6 which is then subjected to an audio compression process to obtain audio data. The audio data subjected to the compression process is supplied to the data process circuit 5 and added with an error correction code or the like to be convolutely coded. Various control codes output from the central control unit 8 are supplied to the data process circuit 5 and then convolutely coded.

The high-frequency process circuit 4 performs GMSK modulation (Gaussian-filtered Minimum Shift Keying modulation) to the convolutely coded data output from the data process circuit 5 to generate a transmission signal, and frequency-converts the transmission signal into a transmission frequency. The transmission signal whose frequency has been converted is supplied to the antenna 2 through an amplification circuit 10 and radio-transmitted to a base station or the like.

The central control unit 8 in the terminal apparatus 1 controls switching of a transmission timing and a reception timing with reference to the predetermined timing detection result obtained by the data process circuit 5. With this operation, by applying a time-division multiplying method, a reception time slot allocated to its own station is selected from signals transmitted from the base station to a plurality of terminal apparatuses to be received, by the central control unit 8 which then selects and a transmission time slot allocated to its own station, so that a process of transmitting audio data and so on to the base station is performed.

In this case, the central control unit 8 assures a work area in a RAM 13 connected to the central control unit to execute a processing program stored in a ROM 11, so that control codes are output to respective circuits as needed to control the entire operation. For example, when a predetermined key of a display key input section 12 is operated, a connection request signal is transmitted to the base station. When a calling signal is transmitted from the base station side, a reception channel or the like is switched to the corresponding channel.

Figure 3:
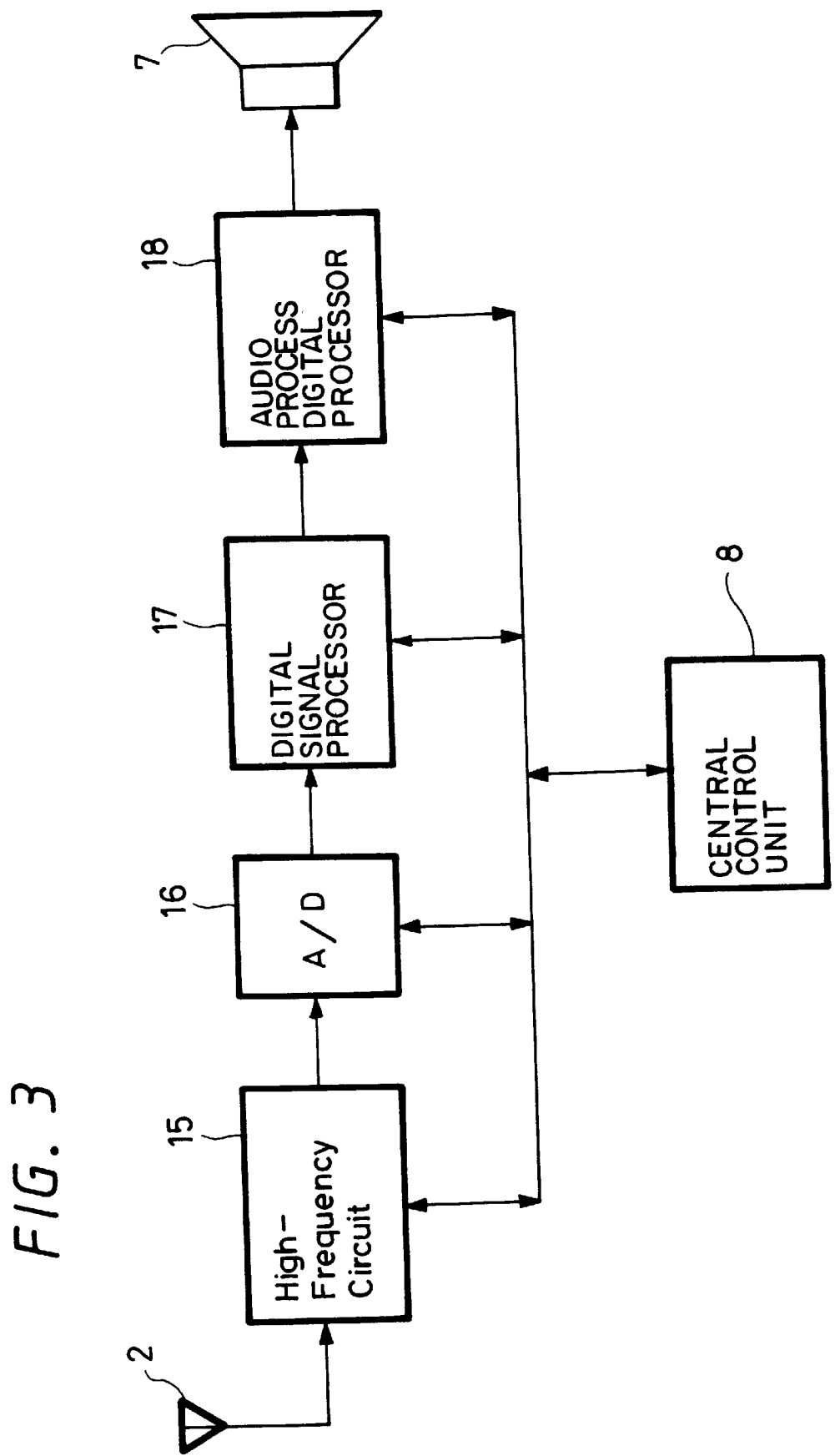
FIG. 3 is a block diagram showing a reception section of the terminal apparatus according to the embodiment.

Next, the details of the reception system of the terminal apparatus 1 according to the present embodiment will be described below with reference to FIG. 3. A signal received by the antenna 2 is subjected to a station-selection process and an intermediate-frequency process and a detection process by a high-frequency circuit 15, and an I signal and a Q signal serving as detection signals are supplied to an analog/digital converter 16. The analog/digital converter 16 performs a digital conversion process to each of the I signal and the Q signal to generate digital I data and digital Q data. The I data and the Q data are supplied to a digital signal processor (DSP) 17 for data process corresponding to the data process circuit 5 described above to decode the I and Q data into an original data string.

At this time, the DSP 17 for data process executes a detection process for an FCCH with reference to the I data and the Q data, and also executes an equalizing process for a reception signal and an error correction process of the decoded data string.

The audio process circuit 6 is constituted by an audio process digital processor 18 for an audio process which processes audio data. The audio process digital processor 18 performs data expansion to the audio data supplied from the DSP 17 for data process to convert the data string which is subjected to audio compression and transmitted into the original data string. The audio process digital processor 18 converts the data string into an analog signal and outputs it from the speaker 7.

Here, before the above series of processes are performed, the terminal apparatus 1 receives a control channel and a frame synchronizing process of synchronizing the control channel to a burst signal transmitted from the base station with reference to an FCCH first is performed. In addition, a frequency error of an internal clock is detected with reference to the FCCH to correct the frequency shift, and the entire operation is synchronized with reception data with reference to a predetermined burst. Thereafter, the terminal apparatus receives a predetermined time slot to receive desired information.

At this time, in the DSP 17 for data process according to this embodiment, correlation values between predetermined reference data and the I and Q data obtained by reception are detected, and a process of detecting an FCCH is performed by the correlation values. When the timing of the FCCH is detected, a time base counter prepared on the central control unit 8 side is set with reference to this timing, thereby frame-synchronizing the entire operation of the terminal apparatus 1.

Figure 1:
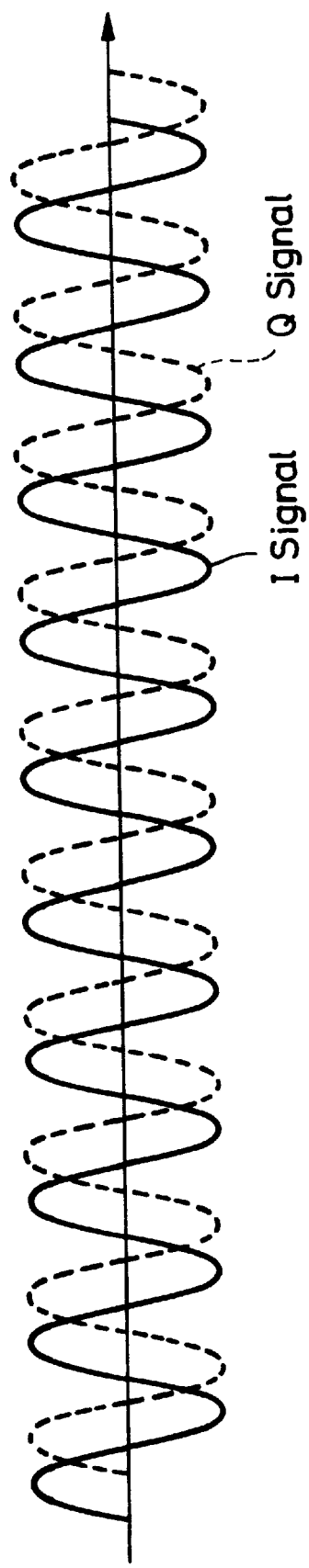
FIG. 1 is a waveform chart for explanation of an FCCH.
Figure 4:
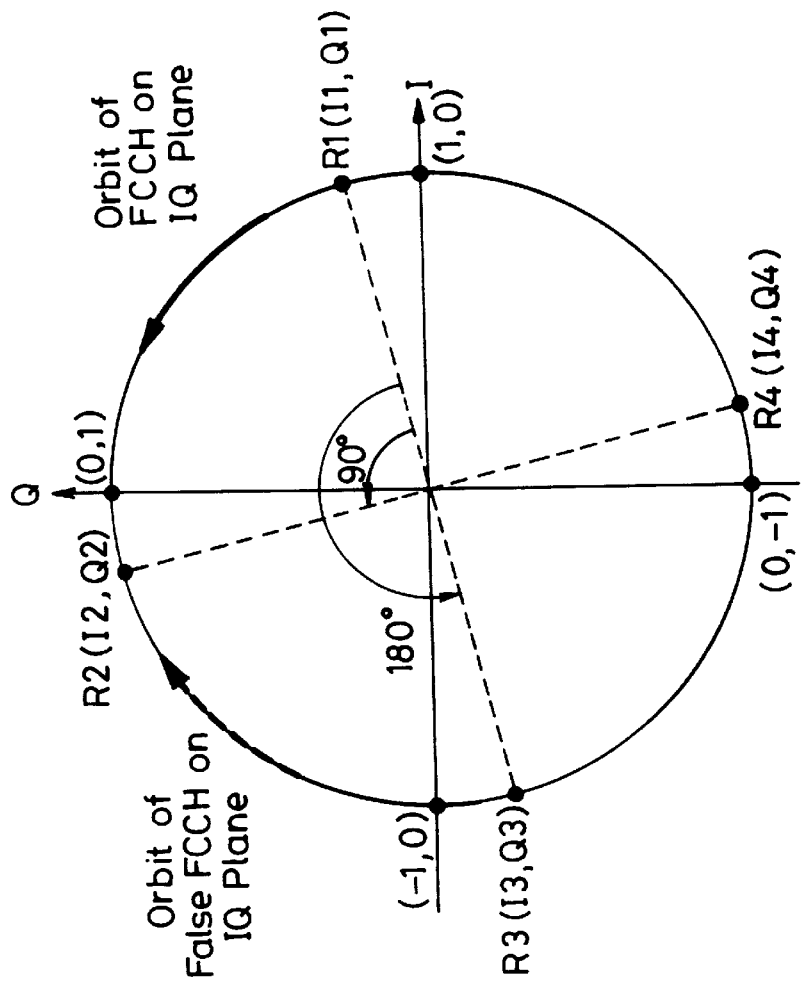
FIG. 4 is an explanatory diagram for illustrating the movement of an FCCH on I and Q coordinates.

Here, the FCCH received by the terminal apparatus 1 according to this embodiment will be described below. An I signal and a Q signal through which the FCCH is transmitted, as described in the prior art example (see FIG. 1), are a synthetic wave of the I and Q signals which are offset by a phase of 90° and have signal level changes in the form of a sine wave. When the wave is sampled for each sample per one bit at a timing synchronized with the I and Q signals, I data and Q data which are obtained, as shown in FIG. 4, form a circular locus rotating counterclockwise by $\pi/2$ radian each on a complex plane formed by an I axis and a Q axis which are perpendicular to each other. More specifically, when sampling is performed for each one sample per one bit, a coordinate point changes from a certain coordinate point R1 (I1,Q1) to R2 (I2,Q2), R3 (I3, Q3), R4 (I4,Q4) . . . As described above, when the sampling process is performed for each sample per one bit, a FCCH can be detected. However, in a radio telephone system using a digital cellular system such as a GSM system, a transmission bit rate is high, i.e., about 270 kbps, and a process time per one bit is extremely short. For this reason, when the DSP 17 for data process performs this detection, a load for the detection becomes considerably large, and the DSP 17 for data process cannot perform another process.

In this embodiment, as a detection process for the FCCH, input data is used once for two sampling operations to reduce a load in the DSP 17 for data process, to thereby make it possible to detect the same. More specifically, since the waveforms of the I and Q of the FCCH after orthogonal detection are simple sine waves, respectively, if a signal coordinate point R3 (I3, Q3) at a point distant from a certain signal coordinate point R1 (I1,Q1) by a time interval corresponding to two bit amounts exists at a point rotated by 180°, the signal orbit can be considered to be rotated half on the circumference.

The FCCH can be detected by continuously detecting rotation of the signal coordinates every 180° for every two bits. According to this embodiment, by using this method, input data is used once for two for sampling operations to detect a FCCH.

Figure 5:
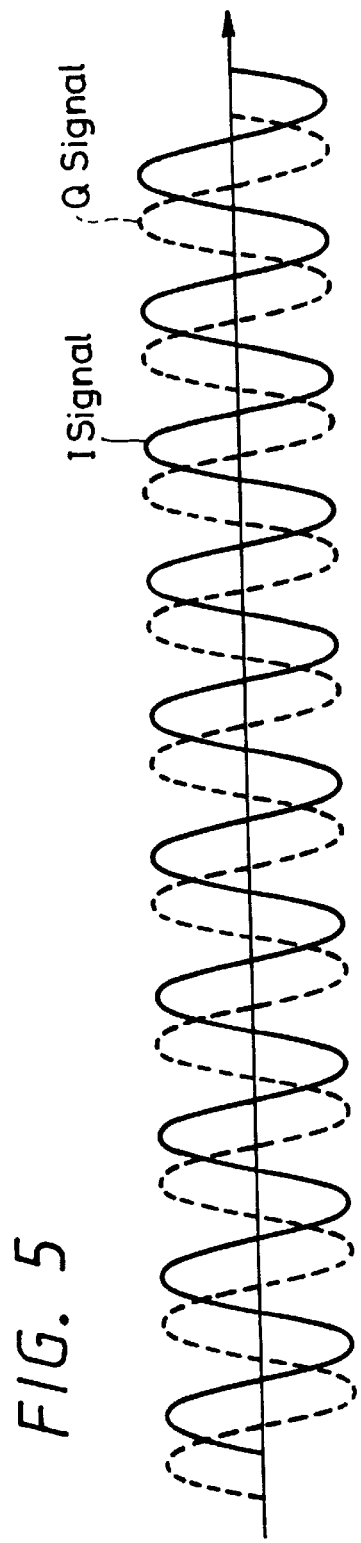
FIG. 5 is a waveform chart for explanation of a false FCCH.

When input data is detected once for two sampling operations, although the signal is not an FCCH, the signal may be detected erroneously as the FCCH. More specifically, as shown in FIG. 5, when a synthetic wave (this signal is called a false FCCH) whose signal level changes in the form of a sine wave and which is offset from the FCCH by 90° when the phase difference between the I and Q signals is inverted is used as reception data, the synthetic wave is erroneously detected as an FCCH. In practice, such a false FCCH state rarely continues for a long period of time, and problems are not actually posed. However, the false FCCH is prevented from erroneously being detected as an FCCH.

A detection process for an FCCH in the DSP 17 for data process according to this embodiment will be described below with reference to the flow chart in FIG. 6. A counter for counting samples and an accumulated addition is set to a value of 0, and a constant for calculation is set to a value of 128, thereby initializing a variable required for a correlation detection process (step 101).

Subsequently, the DSP 17 for data process receives I data and Q data (step 102), and it is checked whether or not the data number (value i in Ii and Qi) of the received data is an even number (step 103). Here, if the data number is not an even number (i.e., odd number), the process returns to step 102 to receive the next data.

Figures 7, 8:
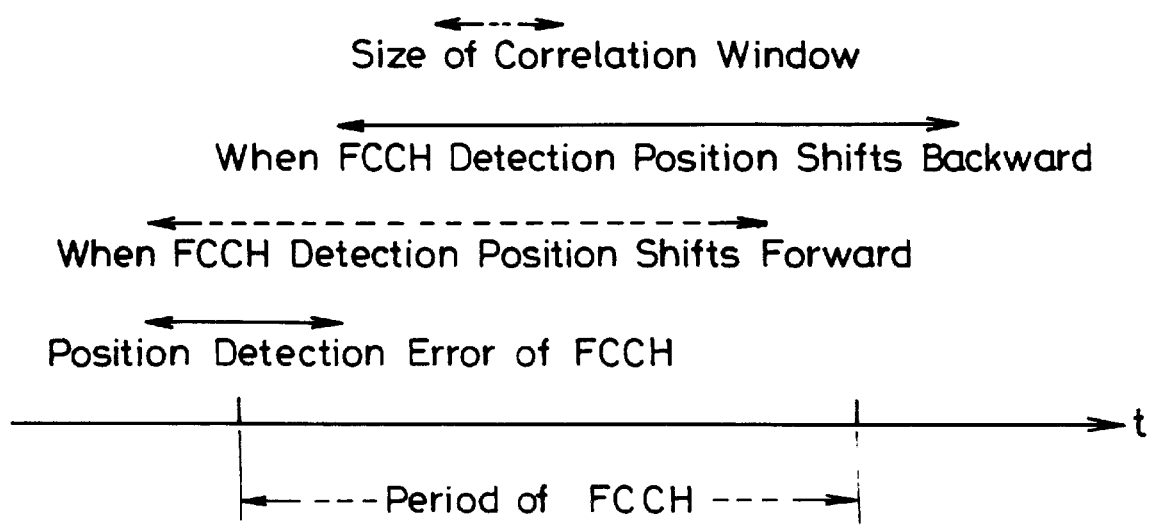
FIG. 7 is an explanatory diagram showing a reference pattern used in detection.
FIG. 8 is a timing chart showing a position detection error of an FCCH.

If it is determined in step 103 that the data number is an even number, a reference waveform is generated (step 104). The reference waveform is stored as data in the ROM 11 connected to the central control unit 8. As shown in FIG. 7, the reference waveform is a waveform (pattern) in which the I and Q data is 1 and −1 at timing t0, respectively, the I and Q data is −1 and 1 at timing t2, respectively, and the values of data at timings t1 and t3 are not defined. As the process of outputting the reference waveform, the uppermost bit of the accumulated addition value is output so to output a reference signal for the Q data. Subsequently, a constant of 128 is added to the accumulated addition value, and then the uppermost bit of the accumulated addition value is output, thereby outputting a reference signal for the I data.

The correlation value between the reference waveform and input data is calculated (step 105). In the process of detecting the correlation value, I data and Q data are represented by Ii and Qi, respectively, the value of the reference waveform is represented by complex conjugate values, i.e., $Ti_i$ and $Tq_i$, and the length of correlation is set to be n. In this case, an intermediate value Ci for calculation is calculated by the following equation.

$$Ci = (IiTi_i + QiTq_i) + j(QiTi_i + IiTq_i) \quad (1)$$

By using the intermediate value Ci, a correlation value Corr is calculated by the following equation.

$$Corr_k = \sum_{i=k}^{k+n-1} Ci \quad (2)$$

The powers of the data and the correlation value are calculated (step 106). More specifically, a power $Power_{rec}$ of the data is calculated by the following equation.

$$Power_{rec} = Ii^2 + Qi2 \quad (3)$$

A power $Power_{cor}$ of the correlation value is calculated by the following equation.

$$Power_{cor} = |Corr_k|^2 \quad (4)$$

The calculated powers are compared with each other in magnitude (step 107). As this comparison, a calculation is performed by the following equation.

$$Power_{rec} - Power_{cor} \times threshold \leq 0 \quad (5)$$

where threshold is a threshold value for determination.

With this calculation process, it is checked whether or not this relational expression is satisfied. By using the result, it is checked whether or not the FCCH is detected (step 108). More specifically, when the left-hand side of the relational expression (5) is a plus value, it is determined that the FCCH is not detected, and the process shifts to step 109 to initialize the count value to 0 and then returns to step 102.

When the left-hand side of the relational expression (5) is a minus value or 0, it is determined that the FCCH is detected and, the count value is set to +1 (step 110). It is checked whether or not the count value exceeds a predetermined value $N_1$. If it is determined that the count value exceeds the predetermined value $N_1$, it is determined that the waveform of continuous FCCH is detected, and it is finally determined that the FCCH is correctly detected (step 112). If the count value does not exceed $N_1$, the process returns to step 102 to make the process of detecting the FCCH continuous.

When the detection process is performed as described above, the FCCH can be detected by using input data once for two sampling operations. Therefore, a load required for the detection process in the detection circuit can be made smaller than that in a case wherein a FCCH is detected by using input data once for one sampling operation, and a FCCH can be preferably detected by the process in the DSP for a transmission/reception process. When the FCCH is detected by the DSP for data process, the DSP can perform other work, and preferably functions as a DSP for the terminal apparatus. When there is no work to be performed by the DSP, electric power required for FCCH detection performed by the DSP can be reduced, and the power consumption of the terminal apparatus can be reduced.

In this embodiment, since the process of comparing correlation powers with each other is performed, a false FCCH is not detected as a FCCH in step 108 and, only the FCCH can be correctly detected.

After the FCCH is detected by the above process once, a re-detection process for the FCCH is carried out in a calculation process for a frequency error. With respect to the re-detection process, the re-detection process may be performed by using the same process as that of the flow chart shown in FIG. 6. However, an FCCH detection confirming process need not be so exact. For this reason, the input data and the correlation value are compared with each other in powers at one point at the middle of correlation detection. If the result satisfies the FCCH detection conditions, it is made sufficient, and a subsequent processing error may be calculated.

Figure 6:
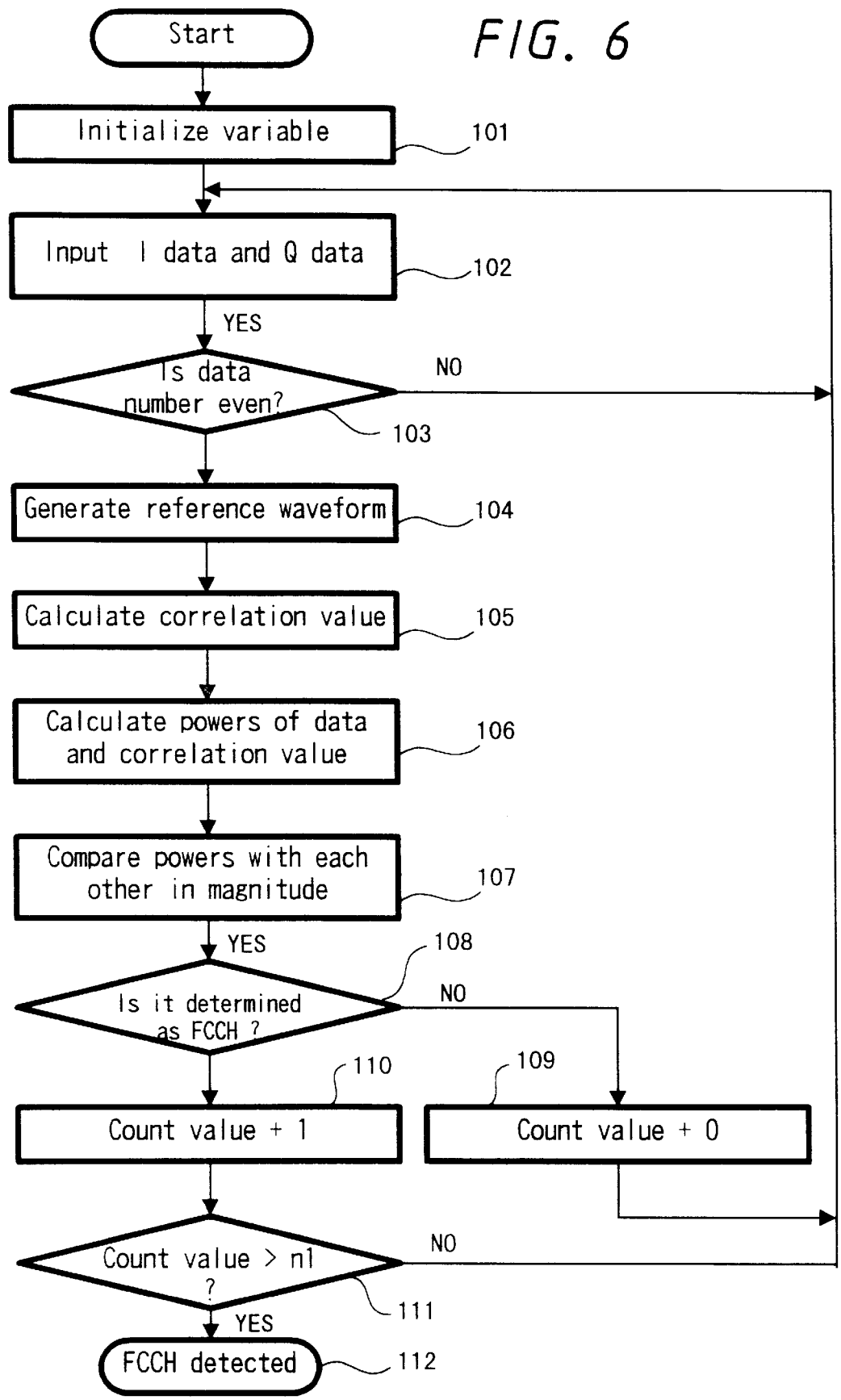
FIG. 6 is a flow chart showing a detection process of an FCCH according to the embodiment.

More specifically, in the process of the flow chart in FIG. 6, when the left-hand side of the relational expression (5) becomes a minus value in comparison between powers in magnitude in a certain period of time, it is confirmed that the FCCH is continuously kept. In the FCCH re-detection process performed here, since the continuity thereof is not so important (only a confirmation process that a signal is not a false FCCH is required), power comparison of the expression (5) is performed once at a position where the signal may be reliably an FCCH, and it is checked whether the signal is an FCCH.

Although the position where the FCCH exists positively means that the FCCH is roughly found by the first FCCH detection, the position includes a position detection error. Therefore, in consideration of the error, the position where the signal may be reliably an FCCH means the position where the FCCH exists. When a correlation value at this position is used, an FCCH can be reliably detected. More specifically, as shown in FIG. 8, when the period of time in which the FCCH continues is related to the position detection error of the FCCH, and the position detection of the FCCH is offset forward or backward, data in a correlation window is derived from the position where the FCCH exists.

In place of discrimination between an FCCH and a false FCCH by carrying out a comparison calculation between correlation powers only once, as in the detection process for the first FCCH, comparison between correlation powers may be performed a plurality of times. At this time, a correlation value need not be continuously used. For example, power comparison may be performed several times every other cycle to confirm FCCH detection. As a threshold value used in this detection, a value equal to the value used in the first FCCH detecting operation need not be used, the value may be increased or decreased in consideration of the probability of FCCH detection.

Figure 9:
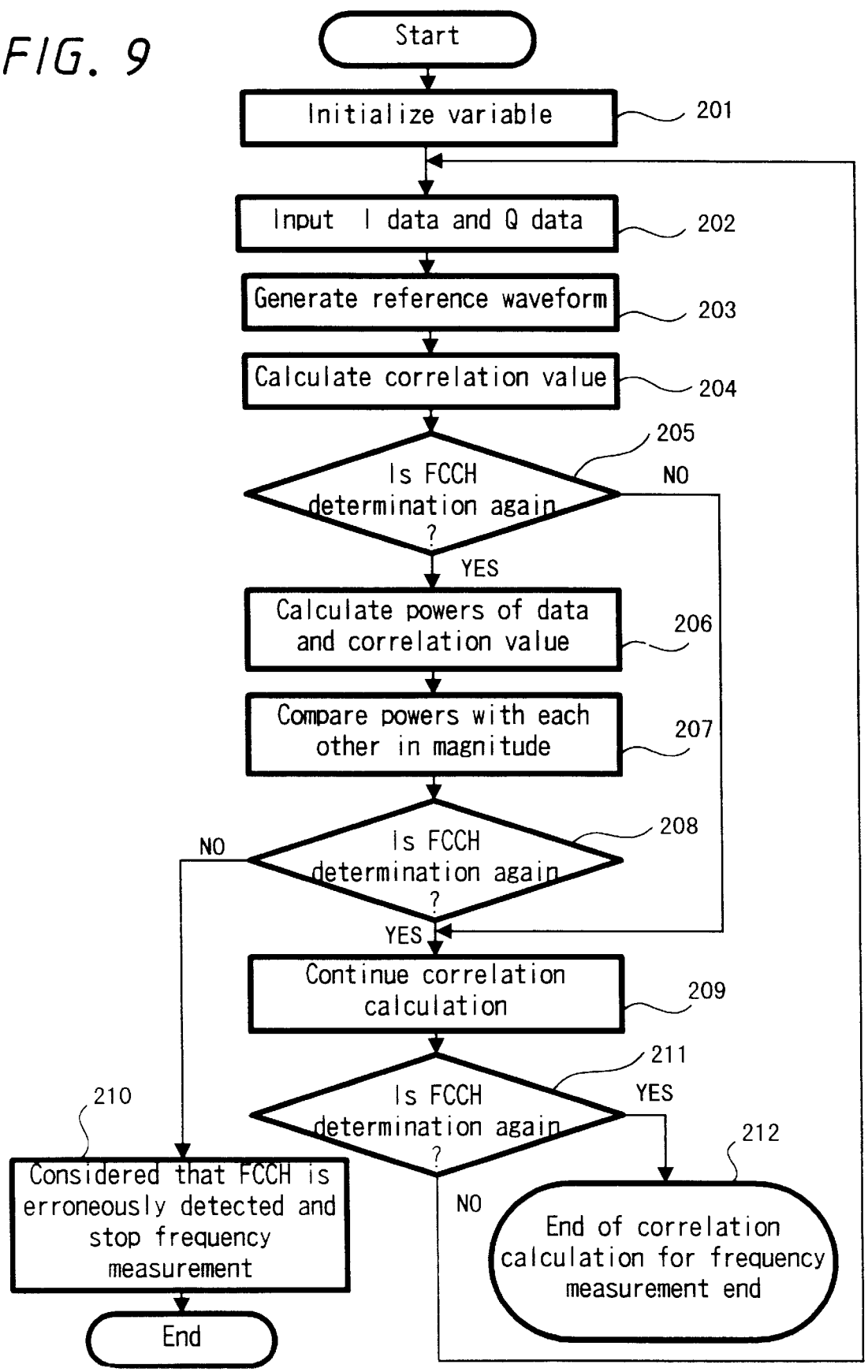
FIG. 9 is a flow chart showing a re-confirming process of detection of an FCCH according to the embodiment.

A process performed when an FCCH detection re-confirming process is making a by performing comparison between correlation powers once to perform a frequency error calculation process is shown in the flow chart in FIG. 9. The process will be described below. First, a counter for counting samples and an accumulated addition is set to a value of 0, and a constant for calculation is set to a value of 64, thereby initializing a variable required for a correlation detection process (step 201). Subsequently, the DSP 17 for data process receives I data and Q data (step 202).

Next, a reference waveform is generated (step 203). This reference waveform is generated by using data stored in, e.g., the ROM 11. A correlation value between the reference waveform and input data is calculated (step 204). In the process of detecting the correlation value, calculation is performed on the basis of expressions (1) and (2) which are described in FCCH detection in the above flow chart of FIG. 6.

It is checked whether or not re-determination for a FCCH is to be performed (step 205). This determination is performed using a predetermined correlation value Corr. In this case, when it is determined that the re-determination is performed, the powers of the data and the correlation value are calculated (step 206). In the process of calculating the powers of the data and the correlation value, calculation is performed on the basis of expression (3) and (4) described in FCCH detection in the above flow chart of FIG. 6. The calculated powers are compared with each other (step 207). With respect to this comparison, the calculation performed by expression (5) described above is carried out. If it is determined in step 205 that the re-determination for an FCCH is not performed, the process shifts to step 209 described below.

In the calculation process in step 207, it is checked whether or not the relational expression (5) is satisfied. On the basis of the result, it is checked whether or not an FCCH is detected (step 208). Here, if the FCCH is detected, a correlation calculation is continued (step 209). If the FCCH is not determined, it is determined that the FCCH is erroneously detected, and the frequency measurement process is ended (step 210).

When it is desired that the correlation calculation be continued, the number of correlation calculation loops is checked (step 211). If the number does not exceed a predetermined number of times $N_2$, the correlation calculation process of measuring a frequency is ended (step 212). If the number exceeds the predetermined number of times $N_2$, the process returns to step 202 to repeat the detection process.

The process of calculating a plurality (p) of correlation values is performed to measure a frequency error, and the re-determination for an FCCH is performed when the p-th correlation value is obtained. For this reason, the re-detection process for confirming an FCCH in detection of a frequency error can be executed with a simple process. In this manner, in measurement of the frequency error and to perform a confirmation that re-input data is an FCCH, the FCCH detection process can be performed at a high speed while the probability of error detection in the FCCH is rarely increased. Since the re-confirming process for the FCCH is performed as a part of the frequency error measurement process as described above, the FCCH detection process can be executed without increasing a data process amount in the process circuit.

In the above embodiment, the present invention is applied to a detection process for synchronizing data (FCCH) in the terminal apparatus for a GSM type radio telephone system. However, the present invention can be widely applied to a reception apparatus for demodulating a data string radio-transmitted with reference to a synchronizing signal in an intermittently transmitted burst signal.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A burst signal reception method for detecting specific data having a constant pattern and arranged at a predetermined position in a burst signal and for performing a reception of the burst signal in synchronization with the specific data, comprising the steps of:

thinning received data of said burst signal in a first sampling period smaller than a second sampling period of said specific data;

sampling the received data; and comparing the sampled received data with stored reference data having the same first sampling period and derived from previously received data for detecting said specific data.

2. The burst signal reception method as set forth in claim 1, wherein, when said comparison step determines that said received data and said previously prepared reference data almost coincide, the specific data is confirmed by data obtained by sampling said received data in a sampling period larger than the second sampling period.

3. The burst signal reception method as set forth in claim 2, wherein said specific data is confirmed by calculating and comparing a power of the received data and a power of a correlation value.

4. A burst signal reception apparatus for detecting specific data having a constant pattern and arranged at a predetermined position in a burst signal and for performing a reception of said burst signal in synchronization with the specific data, comprising:

sampling means for thinning and for sampling received data of said burst signal in a first sampling period smaller than a second sampling period of said specific data; and comparison means for comparing the received data sampled by said sampling means with stored reference data having an equivalent sampling period and derived from previously received data.

5. The burst signal reception apparatus as set forth in claim 4, wherein said sampling means samples the received data in a sampling period which is larger than the second sampling period of said specific data, and when said comparison means determines that said received data and said previously prepared reference data almost coincide, said specific data is confirmed by an output from said sampling means.

6. The burst signal reception apparatus as set forth in claim 5, further comprising:

detecting means for detecting a power of the received data and a power of a correlation value, wherein said specific data is confirmed by comparing the power of the received data and the power of the correlation value.

* * * * *